Figure 1:
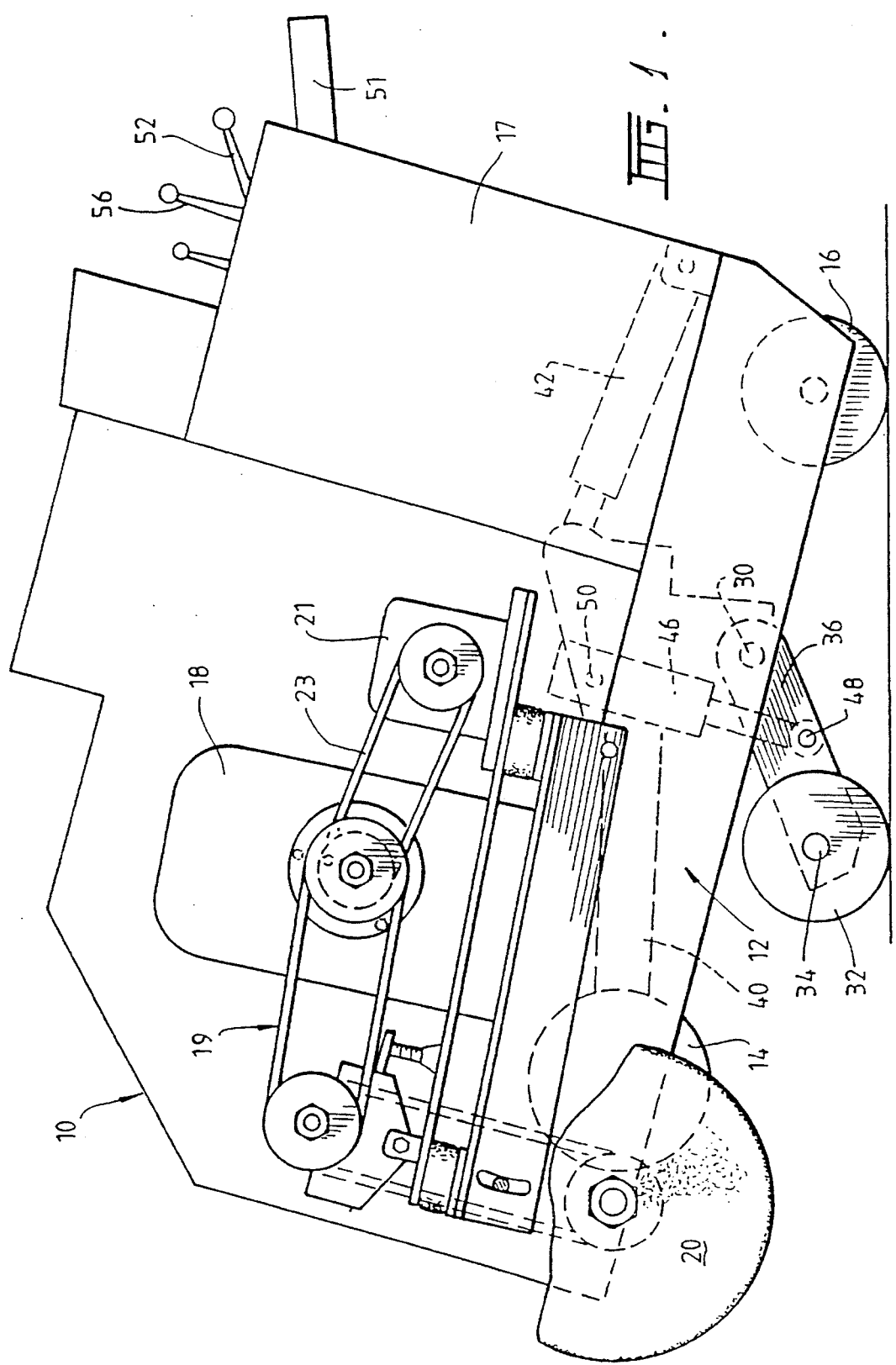

United States Patent [19]
Campbell

[11] Patent Number: 5,452,943
[45] Date of Patent: Sep. 26, 1995

[54] CONCRETE CUTTING MACHINES

[75] Inventor: Peter R. Campbell, Gunning, Australia

[73] Assignee: Peter Campbell Pty Ltd, Gunning, Australia

[21] Appl. No.: 185,932

[22] PCT Filed: Jul. 24, 1992

[86] PCT No.: PCT/AU92/00379

§ 371 Date: Jan. 25, 1994

§ 102(e) Date: Jan. 25, 1994

[87] PCT Pub. No.: WO93/02845

PCT Pub. Date: Feb. 18, 1993

[30]   Foreign Application Priority Data

Jul. 26, 1991 [AU] Australia ................. PK7448

[51] Int. Cl.$^6$ .............. E01C 23/09; B28D 1/04
[52] U.S. Cl. .............................. 299/39; 125/14
[58] Field of Search ................. 299/39; 404/90; 125/13.03, 14

[56]        References Cited

U.S. PATENT DOCUMENTS

| 2,468,336 | 4/1949 | Lewis | 299/39 |
|---|---|---|---|
| 2,858,650 | 11/1958 | Janowitz | 299/39 |
| 3,464,737 | 9/1969 | Haase et al. | 299/39 |
| 4,310,198 | 1/1982 | Destree | 299/39 |

*Primary Examiner*—David J. Bagnell
*Attorney, Agent, or Firm*—Foley & Lardner

[57]           ABSTRACT

A machine (10) for cutting concrete paving or like material is provided having a support frame structure (12), front and rear wheels (14 and 16) and a rotatable cutting blade (20). A pair of auxiliary wheels (32) are also provided between the front and rear wheels on a transverse axle (34) which is pivotally movable relative to the support frame structure (12) about a transverse shaft (30). In an operative position for cutting concrete the front wheels (14) are in engagement with the ground and the auxiliary wheels (32) raised above the ground. Subsequent pivotal movement of the axle (34) relative to the support frame structure (12) about axle (30) lowers the auxiliary wheels (32) into contact with the ground and raises the front wheels (14) above the ground so that the forward part of the support structure (12) is supported by the auxiliary wheels (32) when the machine is out of the cutting mode. The pivotally movable auxiliary wheels (32) provide greater ease of maneuverability out of the cutting mode. The operator can lift the rear wheels (16) off a pavement by means of handles (51) provided at the rear of the machine and realign the machine as required for the next cut. The front wheels (12) are disposed at a forward position close to the cutting blade (20) to provide greater stability in the cutting mode.

14 Claims, 3 Drawing Sheets

CONCRETE CUTTING MACHINES

This invention relates to machines for cutting or sawing concrete paving or like materials such as asphalt, of the type comprising at least one cutting blade, means for driving the cutting blade and a wheeled support structure for supporting the cutting blade and its drive means. Such machines will hereinafter be referred to as "concrete cutting machines".

The invention is particularly concerned with concrete cutting machines of the kind which are adapted to be used by one person who operates and manoeuvres the machine from its rear as it moves forwardly with a rotatable cutting blade at the front end of the machine to cut a pavement or a slab of concrete beneath the front end of the machine. Conventional concrete cutting machines of this kind typically have a pair of front wheels and a pair of rear wheels which may be driven by a motor to move the machine rearwardly or forwardly and a cutting blade located on either side of the machine forwardly of the front wheels, the cutting blade being adapted to be rotatably driven from an internal combustion engine or electric engine mounted on the support structure via a single belt and pulley drive system.

Conventional concrete cutting machines as described above suffer from several disadvantages. Machines which have the front wheels located at a rearward position close to the centre of gravity of the machine are relatively easy to manoeuvre, but track poorly and require more effort from the operator to keep the cutting blade on line if a reasonable cutting speed is to be maintained and many shallow passes can be required during cutting. Machines with the front wheels located at a forward position close to the cutting blade perform better in the cut, but are heavier to handle and manoeuvre, risking back injury to the operator. The result, in conventional machines, is a compromise with the front wheels being located forwardly of the centre of gravity, but behind the ideal position for cutting.

Conventional machines also suffer from poor stability and poor traction of the rear drive wheels; for instance, the location of the front wheels relatively close to the centre of gravity can result in only one of the rear wheels being in contact with the ground and the machine can behave erratically. The machine may, for example, speed up or slow down irregularly or slide forward into the cut to stall the blade depending on circumstances such as ground surface conditions, varying hardness of the concrete or when the concrete includes reinforcements. Generally, the deeper a machine is into the cut, the less traction is available on the rear drive wheels due to weight transference. Further, conventional machines can easily become unstable on slopes, even on gentle slopes such as the crossfall of a road.

It is therefore desirable to provide a concrete cutting or sawing machine which overcomes at least some of above-described disadvantages of conventional machines and, in particular, a machine which is relatively easy to manoeuvre and which is very stable in the cutting mode.

According to one aspect of the present invention there is provided a machine for cutting concrete or like materials comprising a support structure carrying ground-engaging rear wheels and at least one front wheel carried by front wheel support means and being engageable with the ground, and rotatable blade means mounted on the support structure at a front end thereof and adapted to be rotatably driven from a motor or engine, characterized in that the machine includes auxiliary wheel support means carrying one or more auxiliary wheels at a position between the rear wheels and the at least one front wheel, the auxiliary wheel support means being movable relative to the support structure to lower said one or more auxiliary wheels into contact with the ground and to raise the at least one front wheel above the ground so that the forward part of the support structure is supported upon said one or more auxiliary wheels.

Whilst the concrete cutting machine of the invention may have a single, centrally mounted front wheel provided on front wheel support means, preferably a pair of front wheels are provided on a common front wheel support means with each front wheel being mounted inwardly of the rear wheels. Preferably, the auxiliary wheel support means comprises a transverse axle carrying a pair of auxiliary wheels, the transverse axle being disposed approximately vertically below the centre of gravity of the concrete cutting machine.

The inward, forward location of the front wheels provides improved cutting and stability of the machine in the cutting mode for cutting concrete and the disposition of the auxiliary wheels substantially below the centre of gravity of the machine greatly facilitates manoeuvering of the machine when the front wheels are raised off the ground in the manoeuvering mode. In the cutting mode, both rear drive wheels stay in contact with the pavement, so that during the cut the machine will stay on line more easily requiring less correction by the operator and improving the quality of the finished cut producing a straighter, smoother cut face. Also, greatly increased stability in the cut enables the blade to cut more freely making it possible to cut deeper and faster per pass.

The front wheel or each front wheel is preferably carried by front wheel support means mounted for pivotal movement relative to the support structure so as to be movable between a ground-engaging position in the cutting mode and a raised position in the manoeuvering mode, and the auxiliary wheel support means is preferably mounted so as to be pivotally movable relative to both the support structure and the front wheel support means.

The front wheel support means may be pivotally movable about a different transverse axis as the auxiliary wheel support means, but preferably the front wheel support means and auxiliary wheel support means are pivotally movable about a common transverse axis, and the relative pivotal movements may be effected by any convenient actuating means such as hydraulic piston and cylinder assemblies; this has the further advantage that the auxiliary wheels follow the movement of the front wheel or wheels so that the auxiliary wheels do not have to travel as far between their positions in the cutting mode and the manoeuvering mode. In a preferred embodiment, a first piston and cylinder assembly extending longitudinally acts between a rear frame member of the support structure and the front wheel support means, and a second piston and cylinder assembly extends upwardly from a part of the auxiliary wheel support means to act on a part of the front wheel support means.

According to a second aspect of the invention there is provided a concrete cutting machine for cutting concrete or like materials comprising a support structure having a rear end and a front end, a pair of ground-engaging rear wheels provided at the rear end of said support structure, front wheel support means disposed towards the front end of said support structure, one or more front wheels provided on said front wheel support means, rotatable blade means provided at the front end of said support structure, a drive motor or engine supported on the support structure, and means for transmitting drive from the motor or engine to the rotatable blade means, characterized in that the machine further comprises auxiliary wheel support means and one or more auxiliary wheels mounted on said auxiliary wheel support means, said front wheel support means being movable relative to said support structure and said auxiliary wheel support means being movable relative to said support structure and relative to said front wheel support means, first actuating means operable to effect relative movement between said front wheel support means and said support structure, second actuating means operable to effect movement of said auxiliary wheel support means relative to said support structure and to said front wheel support means whereby the front wheel support means, the auxiliary wheel support means and the support structure are relatively movable between a first position for cutting concrete in which said one or more front wheels are in contact with the ground and the auxiliary wheels are raised above the ground and a second position for manoeuvering the machine in which said auxiliary wheels are in engagement with the ground and said one or more front wheels are raised above the ground.

Figure 2:
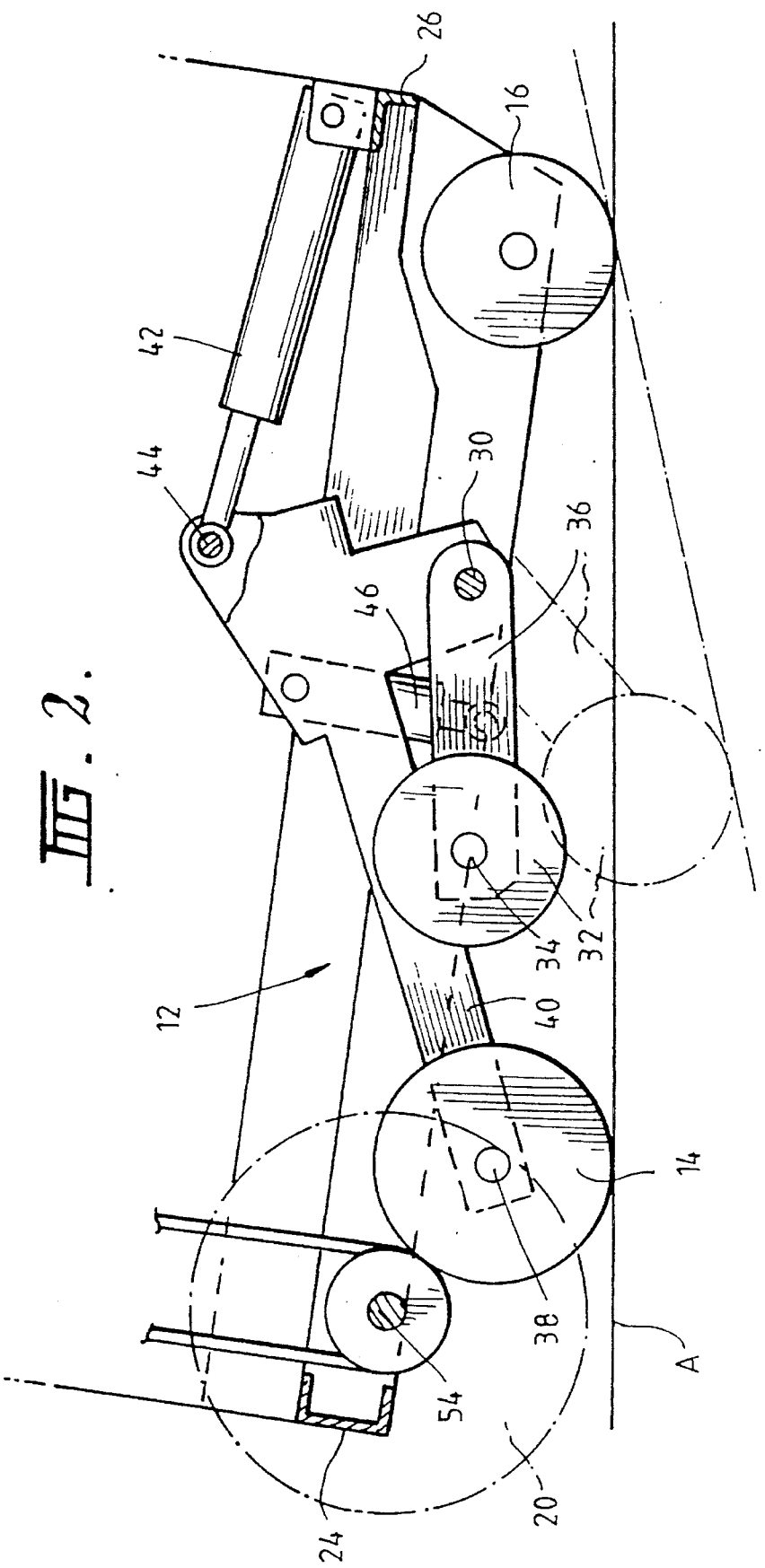
Figure 3:
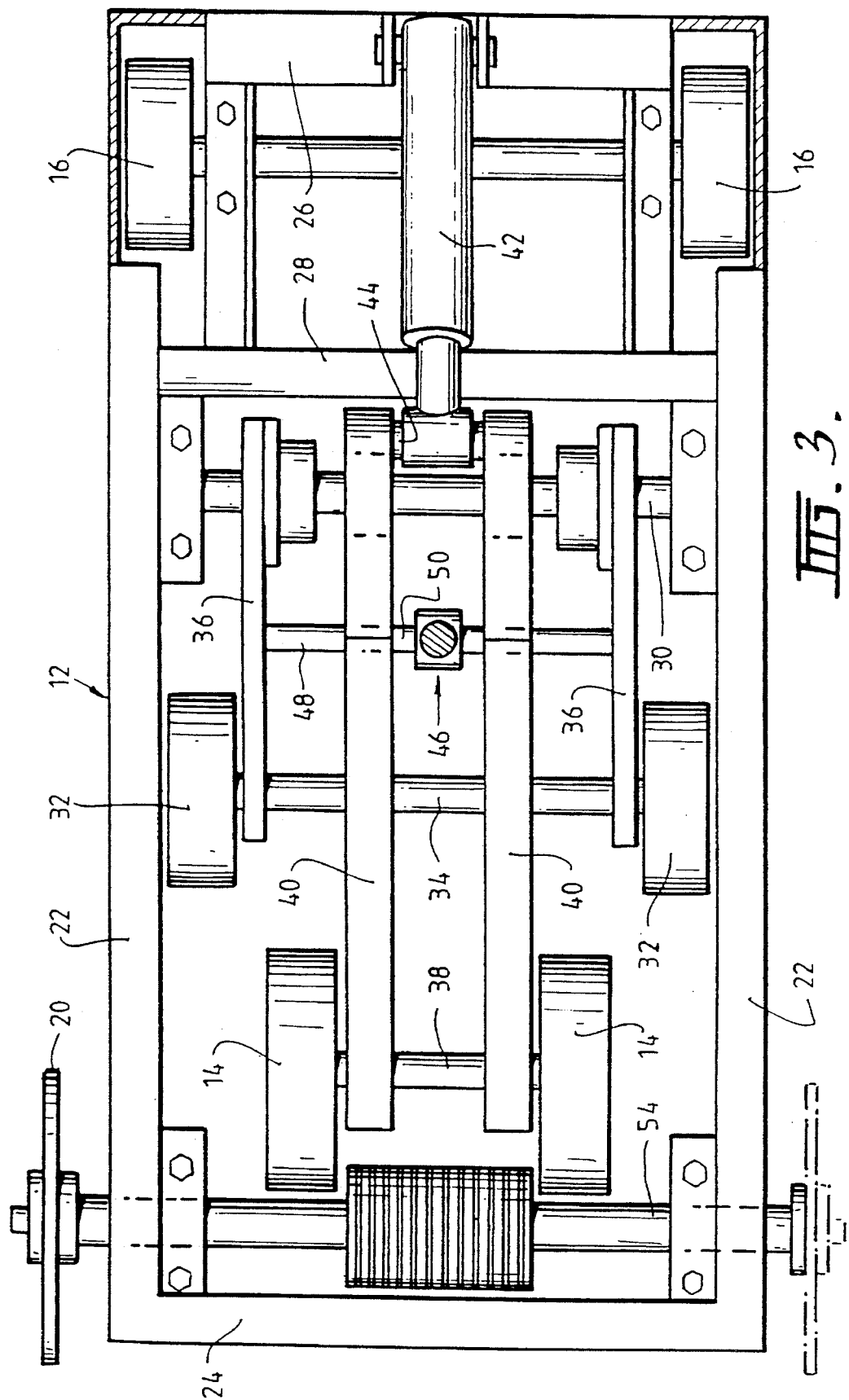

A concrete cutting machine incorporating the various aspects of the present invention will now be described, by way of example only, with reference to the accompanying drawings, in which:

FIG. 1. is a side view of a concrete cutting machine in accordance with the invention with the cutting blade in a raised position and the rear and auxiliary wheels arranged for manoeuvering the machine;

FIG. 2 is a partial side view of the machine in a position with the blade about to enter a pavement or concrete slab for cutting; and FIG. 3 is a plan view of the undercarriage of the concrete cutting machine of FIGS. 1 and 2.

Referring to FIGS. 1 to 3 of the drawing there is illustrated a concrete cutting machine 10 comprising a support structure or frame 12, a pair of front wheels 14, a pair of rear wheels 16 adapted to be driven by an hydraulic motor of an hydraulic system (not shown) housed within a rear housing 17 of the machine to move the concrete cutting machine forwardly or rearwardly, and a rotatable cutting blade 20 disposed at either side of the machine slightly forwardly of the front wheels 14. The blade 20 can be rotatably driven from an engine 18 mounted on the support structure 12 via a blade drive transmission system 19 which is described in more detail in my co-pending International Patent Application entitled "Improved Blade Shaft Drive for Machines having Rotary Cutting or Abrading Tools" the disclosure of which may be considered to form part of this specification as if it were incorporated herein. The engine 18 is also used to drive an hydraulic pump 21 for the hydraulic system via a belt drive 23.

As shown in FIG. 3, the support structure 12 comprises a substantially rectangular frame having longitudinal side members 22, a front frame member 24, a rear frame member 26 and an intermediate frame member 28 extending transversely between the side members 22. Located in front of the intermediate frame member 28 is a transversely extending shaft 30 which forms a pivot for the front pair of wheels 14 and for a-pair of auxiliary intermediate wheels 32. The auxiliary wheels 32 are provided on a transverse axle 34 which is connected by a pair of longitudinally extending support arms 36 to the shaft 30 in such a manner that the arms 36 and the axle 34 constitute support means for the auxiliary wheels 32, the auxiliary wheel support means 34 and 36 being pivotally movable relative to the support frame structure 12 about the axis of the shaft 30.

The front wheels 14 are mounted on a transversely extending front axle 38 connected to the transverse shaft 30 by longitudinally extending support members 40. The axle 38 and the support members 40 constitute front wheel support means which is also pivotally movable relative to the support frame structure 12 about the axis of the shaft 30. Pivotal movement of the longitudinal members 40, front axle 38 and front wheels 14 relative to the support frame structure 12 is achieved by extension or contraction of a first, longitudinally extending hydraulic piston and cylinder assembly 42, one end of which is connected to the rear frame member 26 and the other end of which is connected to a rod 44 extending transversely between the rear ends of the longitudinal members 40 at a position above and slightly to the rear of the transverse shaft 30.

Whilst the drawings show one end of the piston and cylinder assembly 42 connected to the rear frame member 26, in an alternative embodiment (not shown) the piston and cylinder assembly may instead be connected to and extend between any other frame member and a part of the front wheel support means.

A second, substantially vertically extending hydraulic piston and cylinder assembly 46 is provided which has an upper end connected to a transverse element 50 extending between the front axle support members 40 and a lower end connected to a transverse member 48 connected to and extending between the longitudinal support arms 36. Alternatively, the lower end of the piston and cylinder assembly may be connected to a flange on the axle 34. Extension or contraction of the second piston and cylinder assembly 46 causes the support arms 36 and axle 34 of the auxiliary wheels 32 to move relative to the support members 40, front axle 38 and front wheels 14. Control levers 52 and 56 are preferably provided at the rear of the machine to effect actuation of the respective first and second hydraulic piston and cylinder assemblies 42 and 46.

FIG. 1 of the drawings shows the machine in a manoeuvering position in which the operator can grasp a pair of handles 51 extending rearwardly and substantially horizontally from the rear of the machine and use the handles 51 to lift the rear wheels clear of the ground or pavement to manoeuvre the machine easily into the required position for cutting. When the machine is in the required position for cutting the operator actuates one of the control levers 56 to contract the second piston and cylinder assembly 46 to move the front wheels 14 downwardly into engagement with the ground. Further contraction of the piston and cylinder assembly 46 raises the auxiliary wheels 32 above the ground into the position shown in FIG. 2.

FIG. 2 of the drawings shows the concrete cutting machine 10 in a cutting mode just prior to the blade entering a pavement or a slab of concrete beneath the front end of the machine. In this position the front and rear wheels 14 and 16 are in engagement with the ground indicated by line A and the auxiliary wheels 32 are raised slightly above ground level. In this position the operator stands at the rear of the machine where he can control the engine 18 and the blade drive transmission system 19 to cause the cutting blade 20 to rotate. The operator can also control the blade penetration into the pavement by actuating another of the control levers 52 to contract the hydraulic piston and cylinder assembly 42 so that the support structure 12 pivots relative to the support members 40 to move the cutting blade 20 into engagement with the pavement or concrete slab to the required depth of cut and the operator can control drive to the rear wheels 16 to move the machine forwardly or rearwardly. The concrete cutting machine may have a pair of cutting blades, one on each side of the machine, so that the operator can choose which of the blades he wishes or needs to use when cutting a slab of concrete. It will, however, be appreciated that the present invention is equally applicable to a machine having one concrete cutting blade 20 which may be located on either the left or right side of the machine.

When the operator has finished cutting, he can then operate the control lever 52 to actuate the hydraulic piston and cylinder assembly 42 to lift the blade clear of the pavement. From the position shown in FIG. 2, actuation of control lever 56 extends the second piston and cylinder assembly 46 to move the auxiliary wheels 32 downwardly into engagement with the ground and to raise the front wheels 14 and the front end of the support frame structure 12 above the ground into the manoeuvering position shown in FIG. 1 in which the machine is supported by the auxiliary wheels 32 and the rear wheels 16. In this position, the centre of gravity of the machine is located at a position almost vertically above the auxiliary wheel axle 34 thereby greatly enhancing manoeuvrability of the machine as compared with some conventional concrete cutting machines which have front wheels disposed well in advance of the centre of gravity and no auxiliary wheels.

From the above description it will be apparent that the present invention provides an improved wheels and undercarriage arrangement for concrete cutting or sawing machines which provides optimum performance either when the machine is cutting or when it is being manoeuvered. The operator can select either one of two distinctive wheel arrangements. In the cutting mode, maximum machine stability is obtained with each rear wheel in contact with the pavement and each rear wheel and the front wheel or wheels supporting approximately the same weight. In the manoeuvering mode the weight is minimized at the handles, enabling the operator to handle the machine comfortably. The invention thus provides a greater ease of manoeuvrability for the operator when the machine is out of the cutting mode and better stability and reduced vibration during the cutting mode which results in an increased blade life and an improved cut of a better quality finish. It is also possible, when cutting blades of smaller diameters are used, to use the machine for cutting concrete when it is supported on the auxiliary wheels instead of the front wheels. This facilitates use of the machine for making repeated short cuts, enabling the machine after one short cut to be quickly manoeuvered into the position for the next short cut.

It will be appreciated that various modifications may be made to the concrete cutting machine as described above without departing from the scope or spirit of the invention. For instance, the pair of front wheels mounted inwardly close to the longitudinal central axis of the machine may be replaced by a single centrally mounted front wheel. Also, the pivot providing the transversely extending pivotal axis about which the auxiliary wheel support means is movable need not comprise a transversely extending shaft. Further, the front wheel support means does not have to be pivotally movable relative to the support frame structure about the same pivotal axis as the auxiliary wheel support means.

I claim:

1. A manually maneuverable machine for cutting concrete or like materials comprising a support structure carrying ground-engaging rear wheels and at least one front wheel carried by front wheel support means and being engageable with the ground, and rotatable blade means mounted on the support structure and adapted to be rotatably driven from a motor or engine mounted on the support structure, wherein the rotatable blade means is mounted on the support structure at the front end of the machine so that the cutting edge of the blade means is disposed forwardly of the at least one front wheel, and the machine includes auxiliary wheel support means carrying one or more auxiliary wheels at a position between the rear wheels and the at least one front wheel, the front wheel support means and the auxiliary wheel support means being mounted for pivotal movement relative to the support structure about a common transversely extending pivotal axis, the auxiliary wheel support means being movable relative to the support structure to lower said one or more auxiliary wheels into contact with the ground and to raise the at least one front wheel above the ground.

2. A machine according to claim 1 wherein a pair of front wheels are provided on the front wheel support means, each wheel of said pair of front wheels being mounted inwardly of the rear wheels.

3. A machine according to claim 1 wherein the auxiliary wheel support means comprises a transversely extending axle carrying a pair of auxiliary wheels, the auxiliary wheel axle being disposed substantially vertically below the centre of gravity of the machine.

4. A machine according to claim 1, wherein the front wheel support means is movable relative to the support structure, and the auxiliary wheel support means is movable relative to the support structure and to the front wheel support means.

5. A machine according to claim 1 wherein a first actuating means is provided to effect relative pivotal movement between the front wheel support means and the support structure and a second actuating means is provided to effect pivotal movement of the auxiliary wheel support means relative to the support structure and the front wheel support means.

6. A machine according to claim 5 wherein the first actuating means is arranged to act between a frame member of the support structure and a part of the front wheel support means.

7. A machine according to claim 5 wherein the second actuating means is arranged to act between a part of the auxiliary wheel support means extending forwardly from the pivotal axis and a part of the front wheel support means disposed above the pivotal axis.

8. A machine according to claim 5 wherein the first actuating means and the second actuating means each comprises a hydraulic piston and cylinder assembly.

9. A machine for cutting concrete or like materials comprising a support structure having a rear end and a front end, a pair of ground-engaging rear wheels provided at the rear end of said support structure, front wheel support means disposed towards the front end of said support structure, at least one front wheel provided on said front wheel support means, handle means at the rear of the support structure for manually maneuvering the machine, rotatable blade means provided at the front end of said support structure and having a cutting edge disposed forwardly of said at least one front wheel, a drive motor or engine supported on the support structure, and means for transmitting drive from the motor or engine to the rotatable blade means, wherein the machine further comprises auxiliary wheel support means and one or more auxiliary wheels mounted on said auxiliary wheel support means, said front wheel support means being mounted for movement relative to said support structure and said auxiliary wheel support means being mounted for movement relative to said support structure and relative to said front wheel support means, first actuating means comprising a piston and cylinder assembly operable to effect relative movement between said front wheel support means and said support structure, second actuating means operable to effect movement of said auxiliary wheel support means relative to said support structure and to said front wheel support means whereby the front wheel support means, the auxiliary wheel support means and the support structure are relatively movable between a first position for cutting concrete in which said one or more front wheels are in contact with the ground and the auxiliary wheels are raised above the ground and a second position for maneuvering the machine in which said auxiliary wheels are in engagement with the ground and said one or more front wheels are raised above the ground.

10. A machine according to claim 9 wherein said first actuating means is operable in said first position for cutting concrete to move said front wheel support means relative to said support structure to control the depth of cut.

11. A machine according to claim 9 wherein the first actuating means and the second actuating means each comprises a hydraulic piston and cylinder assembly.

12. A machine according to claim 9 wherein the front wheel support means and the auxiliary wheel support means are mounted for pivotal movement relative to the support structure about a common transversely extending pivotal axis.

13. A machine according to claim 12 wherein the second actuating means is arranged to act between a part of the auxiliary wheel support means extending forwardly from said pivotal axis and a part of the front wheel support means disposed above said pivotal axis.

14. A machine according to claim 9 wherein the first actuating means is arranged to act between a frame member of the support structure and a part of the front wheel support means.

* * * * *